March 1, 1932.  I. W. SPRINK ET AL  1,847,449
FORCE DAMPING DEVICE
Filed Sept. 20, 1928  4 Sheets-Sheet 1
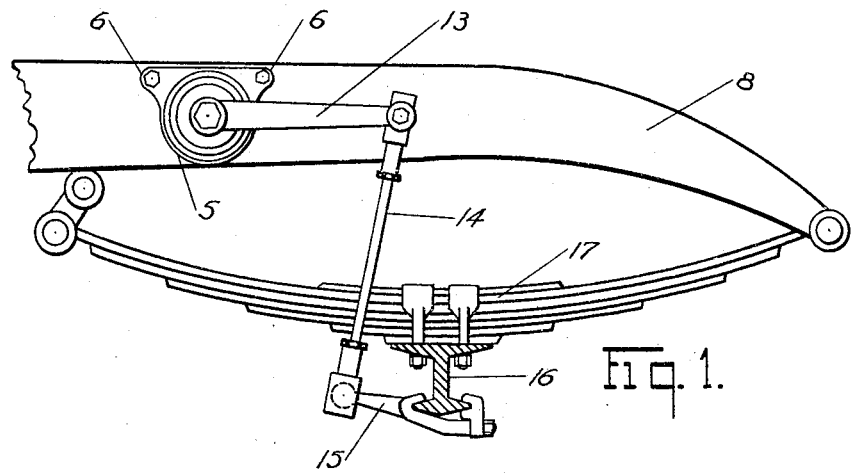
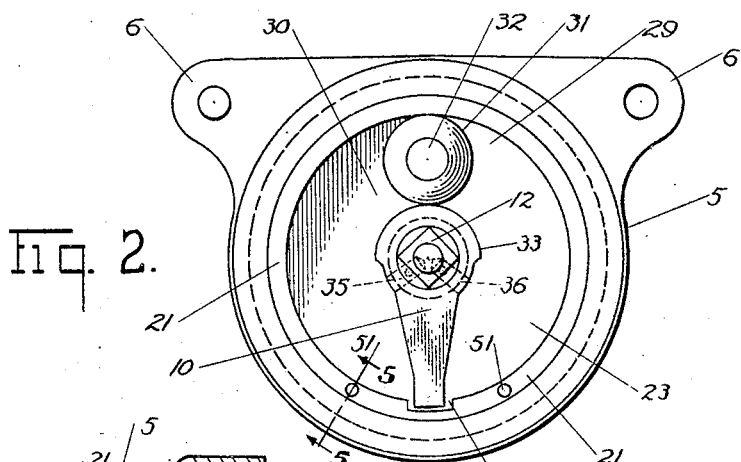
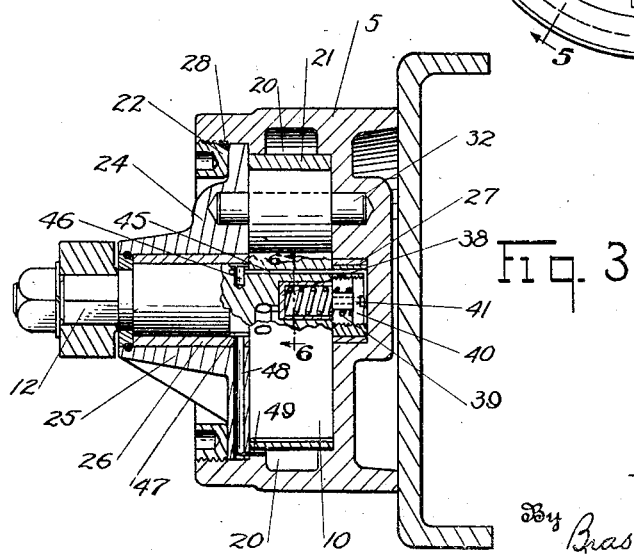
Inventors
John B. Nordholt
Isaac W. Sprink
By Braselton, Whitcomb & Davis
Attorneys March 1, 1932.  I. W. SPRINK ET AL  1,847,449

FORCE DAMPING DEVICE

Filed Sept. 20, 1928  4 Sheets-Sheet 2

Inventors
John B. Nordholt
Isaac W. Sprink
By Braselton, Whitcomb & Davies
Attorneys

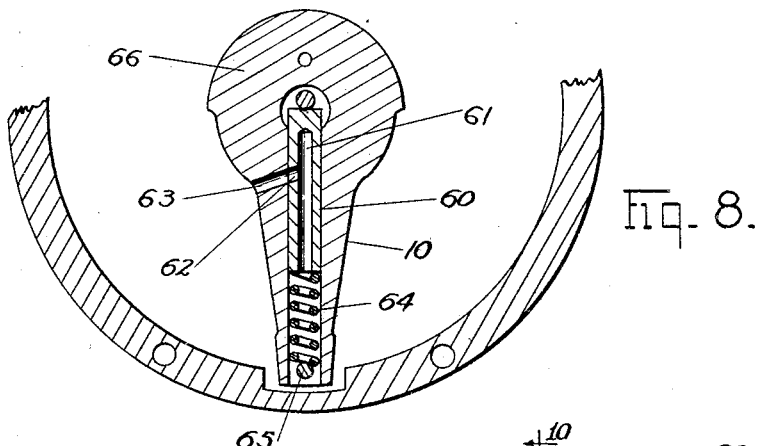
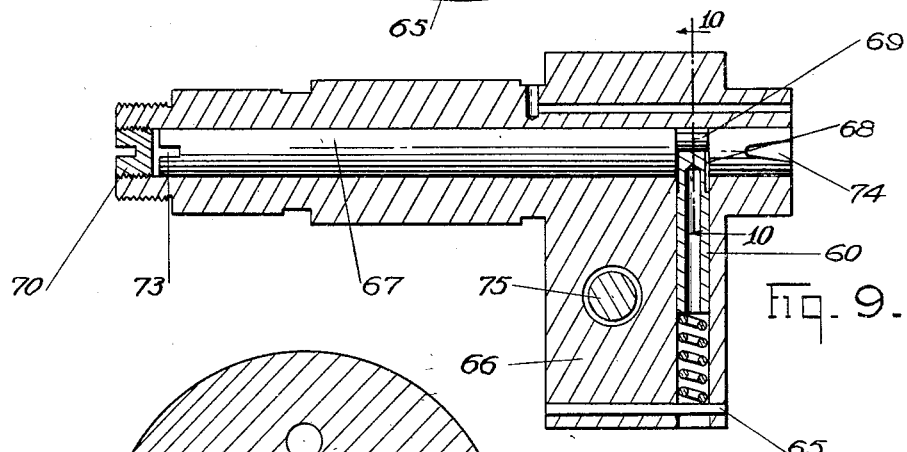
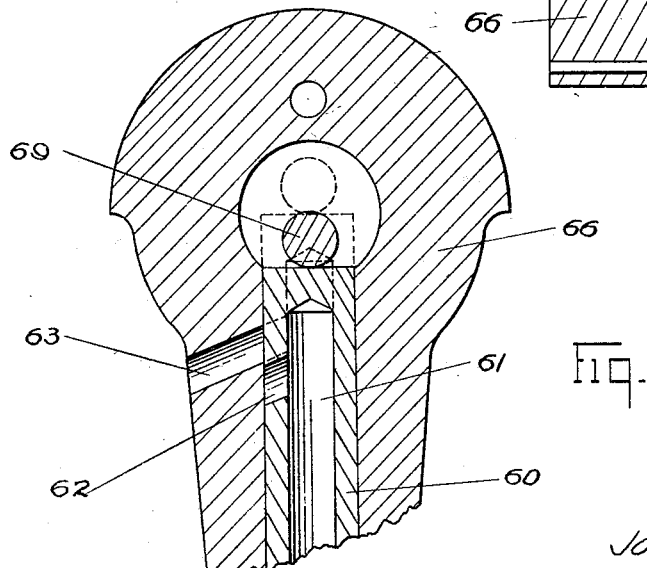

March 1, 1932.  I. W. SPRINK ET AL  1,847,449
FORCE DAMPING DEVICE
Filed Sept. 20, 1928    4 Sheets-Sheet 4

Inventors
John B. Nordholt
Isaac W. Sprink
By Braselton, Whitcomb & Davis
Attorneys Patented Mar. 1, 1932

1,847,449

UNITED STATES PATENT OFFICE

ISAAC W. SPRINK AND JOHN B. NORDHOLT, OF TOLEDO, OHIO, ASSIGNORS TO THE LOGANGEAR PRODUCTS COMPANY, OF TOLEDO, OHIO, A CORPORATION OF OHIO

FORCE DAMPING DEVICE

Application filed September 20, 1928. Serial No. 307,183.

The present invention relates to force damping devices and more particularly to shock absorbers intended to check excessive movement of the vehicle springs when the vehicle is in motion, the device of the present invention being of the type utilizing a substantially non-compressible fluid as a force damping medium.

The invention has for an object to provide a device of this character, wherein comparatively small resistance is offered to the minor flexional movements of the springs, and which is adapted to offer a substantial resistance to excessive movements thereof.

The invention contemplates the utilization of means offering substantial resistance to excessive movements of the springs under severe impacts and for gradually dissipating or decreasing this resistance offered by said means.

The invention has for a further object a means for preventing leakage of the fluid medium from the working chamber.

The invention embraces a shock absorber of simple and compact construction, yet strong and durable, which is reliable in operation, the parts being so made that they can be readily and inexpensively machined and conveniently assembled.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawings of a form of the invention, which may be preferred, in which Figure 1 is a side elevational view of a portion of a vehicle chassis showing the shock absorber of our invention;

Figure 2 is an enlarged top plane view of the shock absorber with the cover removed;

Figure 3 is a vertical transverse sectional view through the shock absorber and a portion of the frame of the vehicle;

Figure 8 is a horizontal sectional view showing a modified arrangement of fluid passages in the operating vane;

Figure 9 is a sectional view through the operating vane showing the adjusting means for the fluid passages therein;

Figure 10 is an enlarged fragmentary sectional view taken substantially on the line 10—10 of Figure 9 showing a portion of the operating vane;

Figure 4:
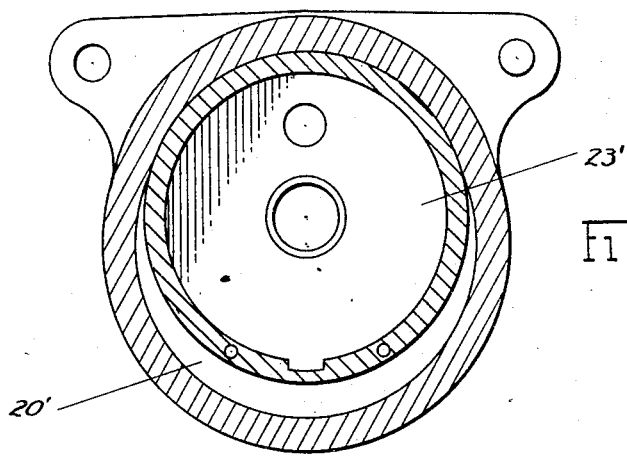
Figure 4 is a horizontal sectional view showing a modified form of the recuperating chamber.

Referring to the drawings in detail, we have shown the device of our invention as used for damping the movements of automotive vehicle springs, but it is to be understood that we contemplate the use of our invention wherever the same may be found to be applicable. With reference particularly to Figures 1, 2, 3 and 6 of the drawings, the device comprises a substantially circular casing 5 having lateral projections 6 for securing the casing to the frame of the vehicle 8. The operating vane or piston 10 within the casing 5 is provided with an extension 12 to which is secured an arm 13, the extremity of the arm being connected by means of a link 14 to a member 15, the latter fixed to the vehicle axle 16. The axle is connected in usual manner to the frame by means of a multi-leaved spring 17.

The inner wall of the casing 5 is provided with an annular recess 20 which forms a reservoir or recuperating chamber for the resistant fluid (not shown). Snugly positioned within the inner wall of the casing is a movable annular ring 21 which separates the recuperating chamber 20 from the working chamber 23. The working chamber 23 is adapted to be suitably enclosed by means of a cover 24 held in place by a threaded ring 22 and a sealing gasket 28 to prevent the leakage of fluid to the outside of the casing. The cover is formed with an extending hub portion 25 provided with a bushing 26 which, together with a bushing 27 fixed within a bore in the rear wall of the casing 5, form bearings for supporting the operating vane or piston 10. The axis of oscillation of the piston 10 is coincident with the center of the annular ring 21.

The working chamber 23 is divided into two separate compartments 29 and 30 by means of the piston vane 10, and a cylindrical member 31, the latter being supported upon a stub shaft 32 projecting into openings in the walls of the casing 5 and cover 24. The piston vane is provided with a circular portion 33 which is adapted to snugly fit the exterior surface of the member 31.

The piston 10 is provided with two passages 35 and 36 which are in communication with a chamber therein normally occupied by a piston valve 38 resiliently held in closed position by means of a spring 39, derangement of the parts being prevented by means of a threaded plug 40 secured to the piston. With the piston valve 38 occupying the position shown in Figure 3, fluid is prevented from passing through the passages 35 and 36; however, upon excessive movements of the piston 10 in either direction which operates to decrease the volumetric content of one of the compartments 29 or 30, depending upon the direction of the movement of the piston, the pressure exerted upon the fluid operates to depress the valve 38 thus permitting the fluid to pass through the passages 35 and 36 and the chamber occupied by the valve.

The extremity of the piston vane 10 extends into a slightly enlarged recess 42 in the annular ring 21, a substantial amount of lost motion existing between the sides of the piston and the walls of the recess, and it is obvious that comparatively slight movements of the vane are substantially unrestrained, as the fluid passes around the extremity of the vane in the recess 42. An excessive movement of the piston however causes one side thereof to engage a side wall of the recess, cutting off the flow of fluid around the end of the piston, further movement of the piston operating to move the ring to a different position.

It is obvious that in the manufacture of the device, and particularly in large quantities, the piston valve 38 may not be accurately fitted so as to prevent fluid from leaking past the valve and we have, therefore, provided means whereby the leakage may flow into the recuperating chamber. The plug 40 is provided with a vent opening 41 leading into a clearance space between the end of the piston shaft and the rear wall of the casing 5. An opening 45 provides a passageway from the clearance space to an opening 46 and an annular channel 47 surrounding the shaft of the piston 10, which in turn is in communication with openings 48 and 49 leading into the recuperating chamber 20. Thus, any leakage entering the valve 38 will pass through the openings 41, 45 and 46, channel 47, passages 48 and 49 and be returned to the chamber 20. Furthermore, should any liquid tend to leave the chamber 20 through the bearing 26, the channel 47 would collect this fluid and return it to the recuperating chamber 20.

Figure 5:
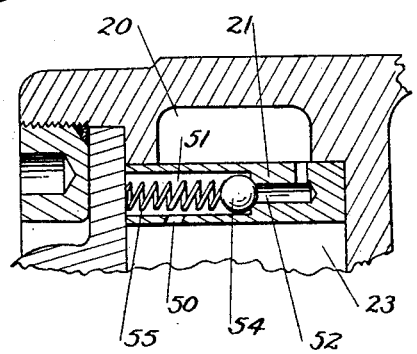
Figure 5 is an enlarged fragmentary sectional view taken substantially on the line 5—5 of Figure 2 showing means whereby fluid is transferred from the recuperating to the working chamber of the device.

Referring particularly to Figure 5, we have provided means whereby the fluid from the recuperating chamber 20 may be automatically transferred to the working chamber 23 which means comprises two series of communicating openings 50, 51 and 52 in the ring 21, each series lying on either side of the end of the piston. Each of the openings 51 is provided with a ball valve 54 which is resiliently held in closed position by means of a spring 55. It will be apparent that oscillatory movements of the piston 10 result in a pumping action which automatically and alternately open the valves 54, and due to the momentary vacuum existing in one of the compartments 29 and 30, depending upon the direction of the movement of the piston, fluid is taken into the working chamber from the recuperating chamber past the valves 54.

The operation of the device is as follows: When the spring 17 is subjected to minor flexional movements in either direction, which movements are transmitted to the piston by means of the link 14 and arm 13, the piston will be moved slightly, but not enough to cause it to engage the side walls of the recess 42 in the ring 21, and fluid is permitted to pass around the end of the piston 10 through the recess so that very little resistance is offered to the movement of the piston. However, should the spring 17 be flexed excessively in an upward direction, a greater movement in a counter clockwise direction will be imparted to the piston 10 causing one side wall thereof to engage a wall of the recess 42 and move the ring 21 in a counter clockwise direction. Obviously the compartment 29 is decreased in volume and the compartment 30 is increased. When the pressure set up in compartment 29 becomes sufficient to overcome the resistance of the spring 39, the piston valve 38 will be opened and the fluid permitted to pass through the openings 35 and 36 and the chamber occupied by the piston valve into the compartment 30. In this manner the resistance tending to damp the upperward movement of the spring 17 is gradually dissipated. As the volume of the compartment 30, by this counter clockwise movement of the piston, has been substantially increased, a partial vacuum exists therein which causes one of the ball valves 54 to be raised permitting fluid to flow into the working chamber, thus keeping the compartments 29 and 30 substantially filled with fluid at all times. When the spring 17 is flexed in the opposite direction, the piston 10 is moved in a clockwise direction and the same operations as hereinbefore described take place.

Obviously, the relative static position of the spring and axle is dependent upon the load upon the vehicle and as this load is varied, the positions of the spring and axle are changed. This change in position is transmitted to the piston vane 10 and causes it to move to another position. In moving to its changed position under the influence of a differential load it also moves the ring 21 with it so that irrespective of the position of the parts, the spring is capable of slight unrestrained flexional movements as the fluid may flow around the end of the piston vane through the recess 42 as hereinbefore described.

In the form of the device shown in Figure 4, we have shown the recuperating chamber 20′ as being eccentric with respect to the working chamber 23′.

Figure 7:
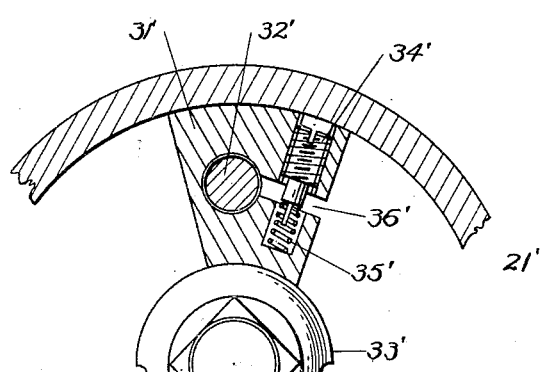
Figure 7 is a detailed sectional view showing a modified form of the device.
Figure 6:
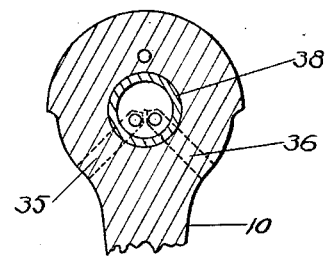
Figure 6 is a fragmentary sectional view taken substantially on the line 6—6 of Figure 3 through the operating vane showing the arrangement of fluid passages therethrough.

In the form shown in Figure 7, the means for separating the working chamber into two compartments comprises a sector shaped member 21′ supported upon a stub shaft 32′, the member being provided with a slot 36′. An adjusting screw 34′ adapted to cooperate with a spring 35′ whereby adjustment of the screw 34′ tends to separate the inner and outer walls of the member 31′ causing them to frictionally engage the circular portion 33′ of the piston vane and the inner wall of the ring 21′ so as to provide against leakage from one compartment to the other on either side of the piston.

In some installations it is desirable to have the shock absorber check the movement of the spring in only one direction. To this end we have provided the piston 10′ with a valve 11′, the valve stem or tenon 12′ being positioned in an enlarged opening 13′ so that when the piston moves in one direction the valve is closed to prevent the passage of fluid, while the movement of the piston in the opposite direction permits the fluid to pass through the opening 13′.

In the form of device shown in Figures 8, 9 and 10, the parts are so arranged that the device may operate to check the movement of the piston in both directions, or in one direction only, and we have provided adjustable means for accomplishing this end.

The structure comprises a sleeve 60 provided with a passage 61 communicating with another passage 62 the latter being adapted for registration with an opening 63 in the piston 66. The sleeve is urged in one direction by means of a spring 64, the latter being held in position by a pin 65. Positioned centrally and axially of the shaft of the piston is a cylindrical member 67 provided with a recess 68 adapted to accommodate the inner extremity of the sleeve 60, and an eccentric portion 69 is adapted for engagement with the sleeve. One end of the opening in the piston containing the member 67 is adapted to be closed by means of a threaded plug 70. It is obvious that a rotary movement of the member 67 will move the sleeve 60 to bring the opening 62 into or out of registration with the opening 63 in the piston whereby the amount of fluid passing through the piston may be controlled as particularly shown in Figure 10. When it is desired to make an adjustment of the sleeve 60, it is only necessary to remove the threaded plug 70, insert a screw driver in the notch 73 in the member 67 and rotate the latter until the sleeve 60 has been moved to the proper position. The other end of the member 67 is split at 74 so that the two portions of the adjusting member will be caused to frictionally engage the walls of the opening, and thus hold the member 67 in adjusted position.

The valve 75 being similar to the valve 11′ shown in Figure 7, is arranged to permit a predetermined rate of flow of fluid from one side of the piston to the other, but is adapted to restrict the flow when the piston is moved in the opposite direction; however, fluid is permitted to pass through the openings 61, 62 and 63, and around the extremity of the piston to the other compartment, the amount of fluid depending upon the position of the valve sleeve 60. It will be apparent from the foregoing that the resistance offered to the movement in one direction may be controlled by changing the relative position of the valve sleeve 60.

Figure 11:
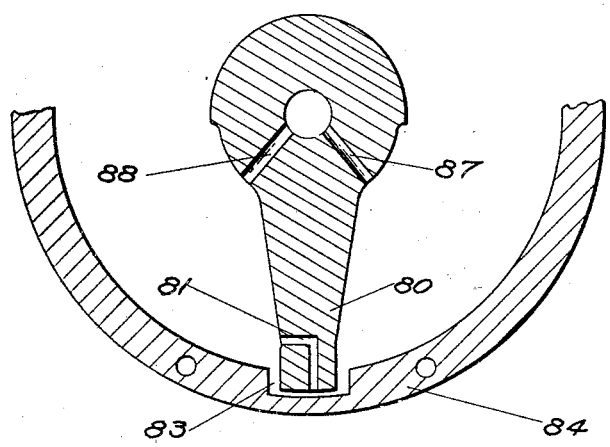
Figure 11 is a fragmentary horizontal sectional view showing a modified arrangement of fluid passages in the operating vane.
Figure 12:
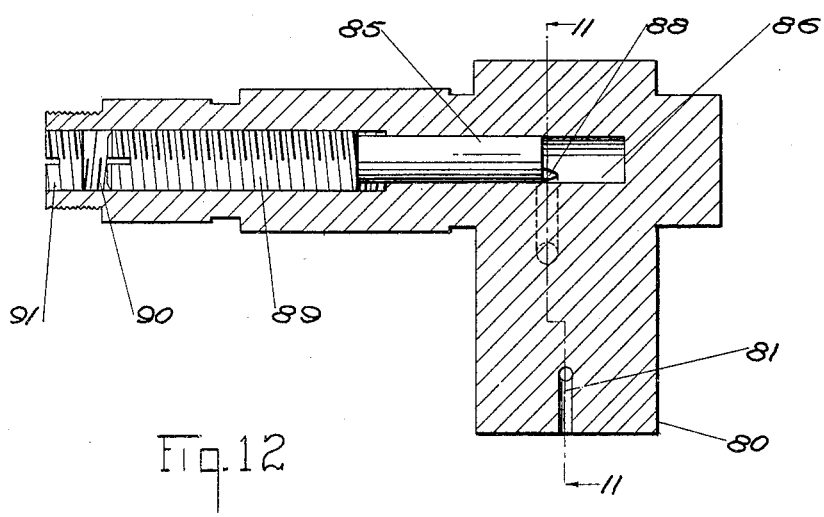
Figure 12 is a sectional view through the operating vane showing the adjusting means for certain fluid passages therein.

In the modified form of the device shown in Figures 11 and 12, the parts are so arranged that the device may operate to check or retard the movement of the piston in one direction only or more in one direction than in the other. The end of the piston vane 80 is provided with a fluid passage 81 which has outlets into one of the working chambers and the slot 83 in the movable ring 84. Positioned axially and centrally of the shaft of the piston vane is a cylindrical member 85 which is movable longitudinally in an opening in a bore 86 which is in communication with openings 87 and 88 communicating with the working chambers. The cylindrical member 85 is provided with a threaded portion 89 cooperating with the threaded opening 90 in the piston. The threaded opening 90 is closed at its outer end by means of a threaded plug 91. It will be apparent from examination of Figure 12 that by removing plug 91 and inserting a screw driver in the slot in the end of the member 89, the cylindrical member 85 may be moved longitudinally so as to regulate the amount of fluid passing through the openings 87 and 88.

In the operation of the device the openings 81 permit the substantial releasing of the pressure when the piston vane is moved in a clockwise direction as the fluid may flow through the openings 81 to the opposite side of the piston. If the piston vane 80 is moved in a counter clockwise direction, the right hand wall of the end of the vane engaging one wall of the recess 83 in the ring 84, will obviously cut off the flow of fluid through the openings 81 so that the only release of the fluid from the right hand chamber is by means of passageways 87 and 88. By this means the device may be made to check in one direction only or in one direction greater than in the opposite direction.

It is apparent that, within the scope of the invention modifications and different arrangements may be made other than is herein disclosed, and the present disclosure is illustrative merely, the invention comprehending all variations thereof.

What we claim is:

1. In a shock absorber the combination of a working chamber adapted to receive a fluid and having a movable wall; a recuperating chamber surrounding said wall a piston operating in said working chamber; and a lost motion connection between said piston and said movable wall.

2. In a shock absorber, the combination of a working chamber adapted to receive a fluid and having a movable wall; a recuperating chamber surrounding said wall a member adapted for oscillation in said working chamber; means cooperating with said member and the wall of said chamber for separating said chamber into two compartments; and a lost motion connection between said member and said movable wall.

3. In a shock absorber, the combination of a cylindrical working chamber having a movable wall; said chamber adapted to contain a working fluid; a member adapted for oscillation in said chamber; a recuperating chamber surrounding said wall; means whereby movements of said oscillating member operate to transfer fluid from said recuperating chamber to said working chamber; and a lost motion connection between said member and said movable wall.

4. In a shock absorber, the combination of a casing; a movable member adapted to separate said casing into a plurality of chambers; a piston in one of said chambers; and a lost motion connection between said member and said piston.

5. In a shock absorber, the combination of a working chamber having a movable wall; said working chamber adapted to contain a fluid; a member positioned in said working chamber and adapted for oscillatory movements therein; and means cooperating with said member and wall of said working chamber separating the working chamber into two compartments; a recuperating chamber surrounding said working chamber; means whereby the movements of said member operate to transfer fluid from the recuperating chamber to the compartments of said working chamber.

6. In a shock absorber, the combination of a working chamber having a substantially cylindrical movable wall; said working chamber adapted to contain a fluid; a vane positioned in said fluid and adapted for oscillatory movements therein; means including a cylindrical member cooperating with said vane and said movable wall for separating the working chamber into two compartments; and a lost motion connection between said member and said cylindrical wall.

7. In a shock absorber, the combination of a casing; a continuous annular ring positioned in said casing and adapted for rotary movement therein; said ring forming a working chamber adapted to contain a fluid; a member positioned in said chamber and adapted for oscillatory movements therein; a lost motion connection between said member and said ring, the parts being so arranged that said member is capable of limited movements independent of said ring.

8. In a shock absorber, the combination of a casing; a movable member adapted to separate said casing into a plurality of chambers; a piston adapted for operation in one of said chambers; and means whereby movements of the piston operate to transfer fluid from one of said chambers to the other.

9. In a shock absorber, the combination of a casing; an annular member separating said casing into two chambers and capable of rotary movement with respect to said casing; said chambers adapted to contain a working fluid; a piston in one of said chambers; and a lost motion connection between said piston and said annular member; and means whereby movements of the piston operate to transfer fluid from one of said chambers to the other.

10. In a shock absorber, the combination of a casing; an annular member separating said casing into two chambers and capable of rotary movement with respect to said casing; said chambers adapted to contain a working fluid; a piston in one of said chambers; and a lost motion connection between said piston and said annular member; and means including a plurality of valves operable upon the movements of the piston for transferring fluid from one chamber to the other.

11. In a shock absorber, the combination of a working chamber having a movable wall; said working chamber adapted to contain a fluid; a piston operating in said working chamber and having a lost motion connection with said movable wall; means cooperating with said piston and said movable wall separating said working chamber into two compartments; a valve carried by said piston; and a plurality of ports communicating with said compartments and said valve.

12. In a shock absorber, the combination of a chamber having a movable wall separating said chamber into two compartments; said compartments adapted to contain a working fluid; said movable wall having a recess; a piston adapted for operation in one of said compartments and projecting into said recess; said piston being capable of limited movement independent of said movable wall.

13. The combination of a vehicle body and supporting axles therefor; a shock dampening device intermediate the vehicle body and supporting axles comprising a chamber having a movable wall separating said chamber into two compartments; a piston operating in one of said compartments; a lost motion connection between said piston and said movable wall whereby a change of the static load upon said vehicle causes said wall to shift its relative position.

14. The combination of a vehicle body; a shock dampening device intermediate the vehicle body and supporting axles comprising a working chamber; a recuperating chamber surrounding the working chamber; said working chamber having a movable wall; a piston operating in said working chamber; the parts being so arranged that material variations in the static load upon said vehicle operates to shift the relative position of said movable wall.

15. The combination of a shock dampening device for vehicles comprising a chamber adapted to contain a fluid resistant medium; a movable member separating said chamber into a plurality of compartments; a piston operating in one of said compartments; a lost motion connection between said piston and said movable member; and means for collecting the leakage from said chamber; and means for conveying said leakage to one of said compartments.

16. In a shock dampening device, a working chamber adapted to contain a fluid resistant medium; a recuperating chamber surrounding said working chamber; a piston adapted for operation in said chamber; a valve in said piston; and means for returning the leakage occurring at said valve to said recuperating chamber.

17. In a shock absorber, the combination of a casing; a member adapted to separate said casing into a plurality of chambers; a piston in one of said chambers; means including a cylindrical member cooperating with said piston and said member for separating one of said chambers into two compartments; means cooperating with the piston constructed and arranged to offer slight resistance to limited movements of said piston and to offer increased resistance to further movements of the piston.

18. In a shock dampening device, a chamber adapted to contain a fluid resistant medium; a piston adapted for operation in said chamber, said piston comprising a shaft and a transversely extending vane, said shaft portion having an axially aligned bore therethrough, said vane portion having a longitudinally disposed bore communicating with the bore in said shaft portion; a valve positioned in the bore in said piston vane; and means positioned in the bore in said shaft portion for adjusting the initial position of said valve, and resilient means for urging said valve to its initial position.

In testimony whereof, we affix our signatures.

ISAAC W. SPRINK.
JOHN B. NORDHOLT.